US007860519B2

(12) United States Patent
Portman et al.

(10) Patent No.: US 7,860,519 B2
(45) Date of Patent: *Dec. 28, 2010

(54) LOCATION-BASED SERVICES SYSTEM

(75) Inventors: Eric A. Portman, Norcross, GA (US);
Michael L. Gailey, Dunwoody, GA
(US); Chad S. Holmes, Atlanta, GA
(US); Michael J. Burgiss, Smyrna, GA
(US); Angela King Smith, Atlanta, GA
(US)

(73) Assignee: Accenture Global Services Limited,
Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/217,223

(22) Filed: Jul. 2, 2008

(65) Prior Publication Data

US 2008/0270224 A1 Oct. 30, 2008

Related U.S. Application Data

(63) Continuation of application No. 10/134,405, filed on Apr. 26, 2002, now Pat. No. 7,698,228, which is a continuation-in-part of application No. 09/946,111, filed on Sep. 4, 2001, now Pat. No. 6,944,447.

(60) Provisional application No. 60/286,916, filed on Apr. 27, 2001.

(51) Int. Cl.
*H04Q 7/20* (2006.01)
(52) U.S. Cl. .................. 455/456.3; 455/440; 455/456.1
(58) Field of Classification Search .................. 705/14, 705/51, 64, 73, 75, 67; 455/422.1, 456.6, 455/456.5, 456.1; 370/328–338
See application file for complete search history.

(56) References Cited

U.S. PATENT DOCUMENTS

| 4,586,160 A | 4/1986 | Amano et al. ............... 364/900 |
| 4,791,281 A | 12/1988 | Johnsen et al. .............. 235/383 |
| 5,343,493 A | 8/1994 | Karimullah .................... 375/1 |

(Continued)

FOREIGN PATENT DOCUMENTS

EP 0 837 406 A2 4/1998

(Continued)

OTHER PUBLICATIONS

Google definitions of "gateway," downloaded Dec. 6, 2009, 2 pgs., http://www.google.com/search?sourceid=navclient&ie=UTF-8&oe—UTF-8&q=define%3A+gateway.

(Continued)

*Primary Examiner*—Evens J Augustin
(74) *Attorney, Agent, or Firm*—Brinks Hofer Gilson & Lione

(57) ABSTRACT

A system and method for tracking purchases in a location-based services system is disclosed wherein a request for information on a particular product is received from a consumer using a remote terminal. A geographically tailored response to the request is then generated with the location-based services system. At least one offer is then displayed to the consumer based on the geographically tailored response. An acceptance of a respective offer made by the consumer is then processed by the location-based services system and information is stored about the transaction in a usage data file or database.

31 Claims, 5 Drawing Sheets

U.S. PATENT DOCUMENTS

| | | | |
|---|---|---|---|
| 5,559,707 A | 9/1996 | DeLorme et al. | 364/443 |
| 5,625,668 A | 4/1997 | Loomis et al. | 379/58 |
| 5,652,570 A * | 7/1997 | Lepkofker | 340/573.4 |
| 5,663,734 A * | 9/1997 | Krasner | 342/357.12 |
| 5,682,525 A | 10/1997 | Bouve et al. | 395/615 |
| 5,717,923 A | 2/1998 | Dedrick | 395/613 |
| 5,752,232 A | 5/1998 | Basore et al. | 704/275 |
| 5,757,232 A * | 5/1998 | Hosoya | 330/252 |
| 5,764,731 A | 6/1998 | Yablon | 379/88 |
| 5,774,860 A | 6/1998 | Bayya et al. | 704/275 |
| 5,794,204 A | 8/1998 | Miyazawa et al. | 704/275 |
| 5,794,235 A | 8/1998 | Chess | 707/5 |
| 5,804,803 A | 9/1998 | Cragun | 235/375 |
| 5,809,471 A | 9/1998 | Brodsky | 704/275 |
| 5,860,063 A | 1/1999 | Gorin et al. | 704/257 |
| 5,898,680 A * | 4/1999 | Johnstone et al. | 370/316 |
| 5,905,246 A | 5/1999 | Fajkowski | 235/375 |
| 5,924,070 A | 7/1999 | Ittycheriah et al. | 704/275 |
| 5,963,940 A | 10/1999 | Liddy et al. | 707/5 |
| 6,014,090 A * | 1/2000 | Rosen et al. | 340/905 |
| 6,016,426 A | 1/2000 | Bodell | 455/422 |
| 6,049,711 A | 4/2000 | Ben-Yehezkel et al. | 455/414 |
| 6,073,112 A | 6/2000 | Geerlings | 705/14 |
| 6,076,099 A | 6/2000 | Chen et al. | 709/202 |
| 6,091,956 A | 7/2000 | Hollenberg | 455/456 |
| 6,112,174 A | 8/2000 | Wakisaka et al. | 704/251 |
| 6,125,342 A | 9/2000 | Selesky | 704/9 |
| 6,157,705 A | 12/2000 | Perrone | 379/88.01 |
| 6,167,255 A | 12/2000 | Kennedy, III et al. | 455/414 |
| 6,181,927 B1 | 1/2001 | Welling, Jr. et al. | 455/414 |
| 6,185,535 B1 | 2/2001 | Hedin et al. | 704/270 |
| 6,195,641 B1 | 2/2001 | Loring et al. | 704/275 |
| 6,199,099 B1 | 3/2001 | Gershman et al. | 709/203 |
| 6,202,023 B1 | 3/2001 | Hancock et al. | 701/201 |
| 6,219,696 B1 | 4/2001 | Wynblatt et al. | 709/218 |
| 6,233,559 B1 | 5/2001 | Balakrishnan | 704/275 |
| 6,236,977 B1 | 5/2001 | Verba et al. | 705/10 |
| 6,243,684 B1 | 6/2001 | Stuart et al. | 704/275 |
| 6,246,672 B1 | 6/2001 | Lumelsky | 370/310 |
| 6,250,557 B1 | 6/2001 | Forslund et al. | 235/492 |
| 6,301,480 B1 | 10/2001 | Kennedy, III et al. | 455/445 |
| 6,301,560 B1 | 10/2001 | Masters | 704/251 |
| 6,308,151 B1 | 10/2001 | Smith | 704/235 |
| 6,317,718 B1 | 11/2001 | Fano | 705/1 |
| 6,332,127 B1 * | 12/2001 | Bandera et al. | 705/14.55 |
| 6,336,098 B1 | 1/2002 | Fortenberry et al. | 705/14 |
| 6,353,398 B1 * | 3/2002 | Amin et al. | 340/995.12 |
| 6,360,167 B1 | 3/2002 | Millington et al. | 701/211 |
| 6,370,514 B1 | 4/2002 | Messner | 705/14 |
| 6,400,956 B1 * | 6/2002 | Richton | 455/456.3 |
| 6,408,307 B1 | 6/2002 | Semple et al. | 707/104.1 |
| 6,418,199 B1 | 7/2002 | Perrone | 379/88.01 |
| 6,418,216 B1 | 7/2002 | Harrison et al. | 379/208.01 |
| 6,424,945 B1 | 7/2002 | Sorsa | 704/270.1 |
| 6,427,115 B1 | 7/2002 | Sekiyama | 701/208 |
| 6,434,524 B1 | 8/2002 | Weber | 704/257 |
| 6,434,526 B1 | 8/2002 | Cilurzo et al. | 704/270.1 |
| 6,452,498 B2 | 9/2002 | Stewart | 340/573.1 |
| 6,460,036 B1 | 10/2002 | Herz | 707/10 |
| 6,466,796 B1 | 10/2002 | Jacobson et al. | 455/456 |
| 6,466,899 B1 | 10/2002 | Yano et al. | 704/1 |
| 6,493,671 B1 | 12/2002 | Ladd et al. | 704/270 |
| 6,501,833 B2 | 12/2002 | Phillips et al. | 379/88.07 |
| 6,502,076 B1 | 12/2002 | Smith | 705/14 |
| 6,505,046 B1 * | 1/2003 | Baker | 455/456.3 |
| 6,510,417 B1 | 1/2003 | Woods et al. | 704/275 |
| 6,513,052 B1 | 1/2003 | Binder | 707/204 |
| 6,535,743 B1 | 3/2003 | Kennedy, III et al. | 455/456 |
| 6,535,854 B2 | 3/2003 | Buchner et al. | 704/275 |
| 6,560,456 B1 | 5/2003 | Lohtia et al. | 455/445 |
| 6,606,745 B2 | 8/2003 | Maggio | 725/23 |
| 6,609,005 B1 * | 8/2003 | Chern | 455/457 |
| 6,614,885 B2 | 9/2003 | Polcyn | 379/88.02 |
| 6,647,257 B2 | 11/2003 | Owensby | 455/414.1 |
| 6,677,894 B2 * | 1/2004 | Sheynblat et al. | 342/357.1 |
| 6,731,940 B1 * | 5/2004 | Nagendran | 455/456.1 |
| 6,748,418 B1 | 6/2004 | Yoshida et al. | 709/204 |
| 6,757,544 B2 | 6/2004 | Rangarajan et al. | 455/456.1 |
| 6,760,426 B2 | 7/2004 | Sbisa et al. | 379/221.09 |
| 6,792,096 B2 | 9/2004 | Martin et al. | 379/218.01 |
| 6,813,499 B2 * | 11/2004 | McDonnell et al. | 455/456.1 |
| 6,834,195 B2 | 12/2004 | Brandenberg et al. | 455/456.3 |
| 6,847,825 B1 * | 1/2005 | Duvall et al. | 455/456.3 |
| 6,848,542 B2 | 2/2005 | Gailey et al. | 186/35 |
| 6,850,766 B2 | 2/2005 | Lau et al. | 455/456.1 |
| 6,859,777 B2 | 2/2005 | Krasle | 704/270.1 |
| 6,898,571 B1 | 5/2005 | Val et al. | 705/14 |
| 6,901,366 B1 | 5/2005 | Kuhn et al. | 704/275 |
| 6,907,119 B2 | 6/2005 | Case et al. | 379/218.01 |
| 6,937,986 B2 | 8/2005 | Denenberg et al. | 704/275 |
| 6,937,995 B1 | 8/2005 | Kepecs | 705/14 |
| 6,944,447 B2 | 9/2005 | Portman et al. | 455/422.1 |
| 6,961,706 B2 | 11/2005 | Saito | 704/275 |
| 6,968,513 B1 * | 11/2005 | Rinebold et al. | 715/854 |
| 6,970,830 B1 | 11/2005 | Samra et al. | 705/10 |
| 6,996,531 B2 | 2/2006 | Korall et al. | 704/270 |
| 7,006,983 B1 | 2/2006 | Packes, Jr. et al. | 705/14 |
| 7,013,148 B1 * | 3/2006 | Ganesh | 455/456.1 |
| 7,020,609 B2 | 3/2006 | Thrift et al. | 704/270.1 |
| 7,028,072 B1 | 4/2006 | Kliger et al. | 709/203 |
| 7,050,816 B2 * | 5/2006 | Fukui et al. | 455/456.1 |
| 7,050,977 B1 | 5/2006 | Bennett | 704/270.1 |
| 7,069,238 B2 | 6/2006 | I'Anson et al. | 705/26 |
| 7,089,264 B1 | 8/2006 | Guido et al. | 707/104.1 |
| 7,130,630 B1 | 10/2006 | Enzmann et al. | 455/435.1 |
| 7,233,655 B2 | 6/2007 | Gailey et al. | 379/210.01 |
| 7,245,910 B2 * | 7/2007 | Osmo | 455/432.1 |
| 7,254,384 B2 | 8/2007 | Gailey et al. | 455/412 |
| 7,336,942 B2 * | 2/2008 | Wang | 455/404.2 |
| 7,343,317 B2 | 3/2008 | Jokinen et al. | 705/14 |
| 7,376,586 B1 | 5/2008 | Partovi et al. | 705/26 |
| 7,412,260 B2 | 8/2008 | Gailey et al. | 455/563 |
| 7,437,295 B2 | 10/2008 | Pitts, III et al. | 704/275 |
| 7,441,016 B2 | 10/2008 | Gailey et al. | 709/219 |
| 7,472,091 B2 | 12/2008 | Gailey et al. | 705/51 |
| 7,698,228 B2 | 4/2010 | Gailey et al. | 705/64 |
| 2001/6044309 | 11/2001 | Bar et al. | 455/456 |
| 2001/0053999 A1 | 12/2001 | Feinberg | 705/14 |
| 2002/0004745 A1 | 1/2002 | Bascobert et al. | 705/14 |
| 2002/0029172 A1 | 3/2002 | L'Anson et al. | 705/26 |
| 2002/0035474 A1 | 3/2002 | Alpdemir | 704/270 |
| 2002/0035568 A1 | 3/2002 | Benthin et al. | 707/102 |
| 2002/0036654 A1 | 3/2002 | Evans et al. | 345/744 |
| 2002/0040297 A1 | 4/2002 | Tsiao et al. | 704/257 |
| 2002/0046084 A1 | 4/2002 | Steele et al. | 705/14 |
| 2002/0046104 A1 | 4/2002 | Kaddeche et al. | 705/14 |
| 2002/0049644 A1 | 4/2002 | Kargman | 705/26 |
| 2002/0090934 A1 | 7/2002 | Mitchelmore | 455/412 |
| 2002/0103698 A1 | 8/2002 | Cantrell | 705/14 |
| 2002/0107027 A1 | 8/2002 | O'Neil | 455/456 |
| 2002/0133477 A1 | 9/2002 | Abel | 707/1 |
| 2002/0143550 A1 | 10/2002 | Nakatsuyama | 704/270.1 |
| 2002/0143638 A1 | 10/2002 | August | 705/26 |
| 2002/0143639 A1 * | 10/2002 | Beckett et al. | 705/26 |
| 2002/0161625 A1 | 10/2002 | Brito-Valladares et al. | 705/10 |
| 2002/0166127 A1 | 11/2002 | Hamano et al. | 725/105 |
| 2003/0023440 A1 | 1/2003 | Chu | 704/249 |
| 2003/0041050 A1 | 2/2003 | Smith et al. | 707/1 |
| 2003/0135853 A1 | 7/2003 | Goldman et al. | 725/34 |
| 2003/0154126 A1 | 8/2003 | Gehlot et al. | 705/14 |
| 2003/0182131 A1 | 9/2003 | Arnold et al. | 704/275 |
| 2004/0166832 A1 | 8/2004 | Portman et al. | 455/412.1 |
| 2005/0027590 A9 | 2/2005 | Gailey et al. | 705/14 |
| 2005/0027591 A9 | 2/2005 | Gailey et al. | 705/14 |

| | | |
|---|---|---|
| 2005/0102180 A1 | 5/2005 | Gailey et al. .................. 705/14 |

FOREIGN PATENT DOCUMENTS

| | | |
|---|---|---|
| JP | 11-046193 | 2/1999 |
| JP | 11-065434 | 3/1999 |
| JP | 11-069404 A | 3/1999 |
| JP | 2000-067047 | 3/2000 |
| JP | 2000-268042 | 9/2000 |
| JP | 2001-004387 | 1/2001 |
| JP | 2001-005483 | 1/2001 |
| JP | 2001-014252 | 1/2001 |
| JP | 2001-043479 | 2/2001 |
| JP | 2001-057593 | 2/2001 |
| JP | 2001-101000 | 4/2001 |
| JP | 2001-516905 | 10/2001 |
| JP | 2002-536755 | 10/2002 |
| KR | 1999-0082755 | 11/1999 |
| WO | WO 97/50002 A1 | 12/1997 |
| WO | WO 98/49641 A1 | 11/1998 |
| WO | WO 99/14743 A1 | 3/1999 |
| WO | WO 99/62013 A1 | 12/1999 |
| WO | WO 00/21232 A2 | 4/2000 |
| WO | WO 00/29982 A1 | 5/2000 |
| WO | WO 00/46792 A1 | 8/2000 |
| WO | WO 01/26393 A1 | 4/2001 |

OTHER PUBLICATIONS

Google definitions of "advertising campaign," downloaded Dec. 7, 2009, 1 pg., http://www.google.com/search?sourceid=navclient&ie=UTF-8&oe=UTF-8&q=define%3A+advertising+campaign.

Google definitions of "business rule," downloaded Dec. 12, 2009, 1 pg., http://www.google.com/search?sourceid=navclient&ie=UTF-8&oe=UTF-8&q=define%3A+business+rule.

Google definitions of "probability," downloaded Dec. 12, 2009, 2 pgs., http://www.google.com/search?sourceid=navclient&ie=UTF-8&oe=UTF-8&q=define%3A+probability.

Google search for definitions of "data scoring," downloaded Dec. 13, 2009, 1 pg., http://www.google.com/search?sourceid=navclient&ie=UTF-8&oe=UTF=8&q=define%3A+Data+scoring.

Nakajima, T., "Review of Web Sites, Goal Being Sites Easy to Use for User," Nikkei Internet Technology, Nikkei Business Publications, Inc., Japan, Oct. 22, 2000, vol. 40, pp. 122-139. (with concise explanation of relevance in English).

Shirai, H., Yokoyama, K., Sudo, M., Hakomori, S., Inoue, U., "Design and Implementation of a User Oriented Information System in a Mobile Computing Environment," Research Paper in Information Processing Society, IPSJ, Japan, May 15, 1998, vol. 98, No. 34, pp. 9-16. (with concise explanation of relevance in English).

Akiyama, T., Niwa, M., Watanabe, M., Tomikashi, M., Konishi, T., Itoh, Y., "Constructing a Natural Language Interface of Car Navigation Systems," Collection of Reports Produced to the Information Processing Academy, vol. 99, No. ITS-2, pp. 53-60, published by the Information Processing Academy on Jun. 3, 1999; (Translation—Abstract only).

"The Risks Digest," ACM Committee on Computers and Public Policy, Peter G. Neumann, moderator, vol. 21, Issue 5, Sep. 2000, http://catless.ncl.ac.uk/Risks/21.05.html.

Google definitions of "server" downloaded May 31, 2009, http://www.google.com/search?sourceid=navclient&ie=UTF-8&oe=utf-8&q=define%3A+server (1 of 2) May 31, 2009 and http://www.google.com/search?sourceid=navclient&ie=UTF-8&oe=UTF-8&q=define%3A+server (2 of 2) May 31, 2009.

Australian Office Action issued Jul. 13, 2010, in Australian Patent Application No. 2008201023 (2 pgs.).

* cited by examiner

LOCATION-BASED SERVICES SYSTEM

This application is a continuation of U.S. patent application Ser. No. 10/134,405, filed Apr. 26, 2002 now U.S. Pat. No. 7,698,228, which is a continuation-in-part of U.S. application Ser. No. 09/946,111, filed Sep. 4, 2001 now U.S. Pat. No. 6,944,447, which claims the benefit of the filing date under 35 U.S.C. §119(e) of U.S. Provisional Application Ser. No. 60/286,916, filed Apr. 27, 2001, all of which are incorporated herein by reference.

FIELD OF THE INVENTION

The present invention relates generally to location-based services systems, and more particularly, to tracking purchases that were offered or advertised to consumers through the location-based services system.

BACKGROUND OF THE INVENTION

Wireless communication devices have recently evolved from a technology used by an elite segment of the population to a technology that is used by the masses. In the year 2000, it has been estimated that well over 100 million people in the United States alone subscribed to at least one type of wireless communication service. Worldwide, the number of wireless communication device users has reached a staggering number and is growing all of the time. In the near future, it is envisioned that almost everyone will own or use some sort of wireless communication device that is capable of performing a variety of functions.

In addition to traditional wireless communication devices, many different types of portable electronic devices are in use today. In particular, notebook computers, palm-top computers, and personal digital assistants (PDA) are commonplace. The use of wireless communication devices is widespread and it is expected that in the near future combined mobile telephone/PDA devices will be widely used by the masses. Currently, most of these devices are only used by a small segment of the population due, in large part, to the fact that there are a limited number of applications and services available for such devices.

The Internet has become a widely used medium for providing business information in a variety of forms that are targeted to various types of individuals and businesses. Generally speaking, one of the problems associated with searching for business information on specific products and services using the Internet is being able to locate relevant business information for products and services that are available in a geographic area that is located near the user. As such, a need exists for a way to provide a broad range of business information and content to wireless communication devices and workstations that are based on the respective geographic location of the communication device at the time the information is requested.

Users of several different types of remote terminals often desire to use directory assistance services that are provided by various telephone companies. Many of these directory assistance calls originate in a respective metropolitan telephone service area and request listing information for listings contained in the same metropolitan service area. Most local directory assistance services in use today are handled by an operator that assists the requestor by manually inputting the requested information into an application that searches a database containing residential and business listings. As such, a need exists for providing an enhanced directory assistance system that is capable of automatically providing geographically targeted responses to requestors.

As set forth above, a need exists for location-based systems that allow users to search for relevant businesses, services or products based on the geographic location of the user. In order to monitor transactions completed or deals offered to consumers through the location-based system, a method and system is needed to track purchases and use of the location-based system.

SUMMARY OF THE PRESENT INVENTION

A preferred embodiment of the present invention discloses a method for tracking purchases in a location-based services system. In this embodiment, a request for information on a particular product is received from a consumer using a remote terminal. A geographically tailored response to the request is then generated with the location-based services system. Then, at least one offer is displayed to the consumer that is based on the geographically tailored response. An acceptance of a respective offer made by the consumer is then processed by the location-based services system.

A campaign offer identifier is preferentially assigned to each offer or tailored response. Each campaign offer identifier and the contents of the offer itself are then stored in a usage database or data file. Each campaign offer identifier is also associated with a respective consumer and a respective business making the offer. If the consumer purchases a product, the consumer is charged for the product. Preferentially, an electronic payment card is charged for the product. Information about the electronic payment card is also preferably stored, wherein the information that is stored may be selected from a group of information including a card number, a merchant code, a merchant name, a merchant address, a transaction type, a identifier of products purchased, an amount of purchase, a date of purchase and a time of purchase.

The geographically tailored response can be generated based on a geographic setting made on the remote terminal by the consumer. As such, if the consumer is traveling from one location to another location they are able to receive responses that are tailored to the area they are traveling toward or their final destination. During operation, a plurality of information about each offer is stored in the usage database or data file. The information is selected from a group of information including a campaign identifier, a merchant name, a consumer identifier, a campaign code, a date, a time, a geographic location of said consumer and an offer number.

Another preferred embodiment of the present invention discloses a location-based services system with purchase tracking. This embodiment includes a remote terminal that is capable of generating a tailored request for information on a product and a geographic indicator that is associated with the remote terminal. A location-based application server is connected to each remote terminal and is operable to receive the tailored requests for information and the geographic indicator from the remote terminal. The location-based application server is also operable to generate a structured response to the tailored request for information on the product that is dependent on the geographic indicator provided by the remote terminal. The structured response is preferentially transmitted to the remote terminal and displayed on the remote terminal in the form of at least one offer.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
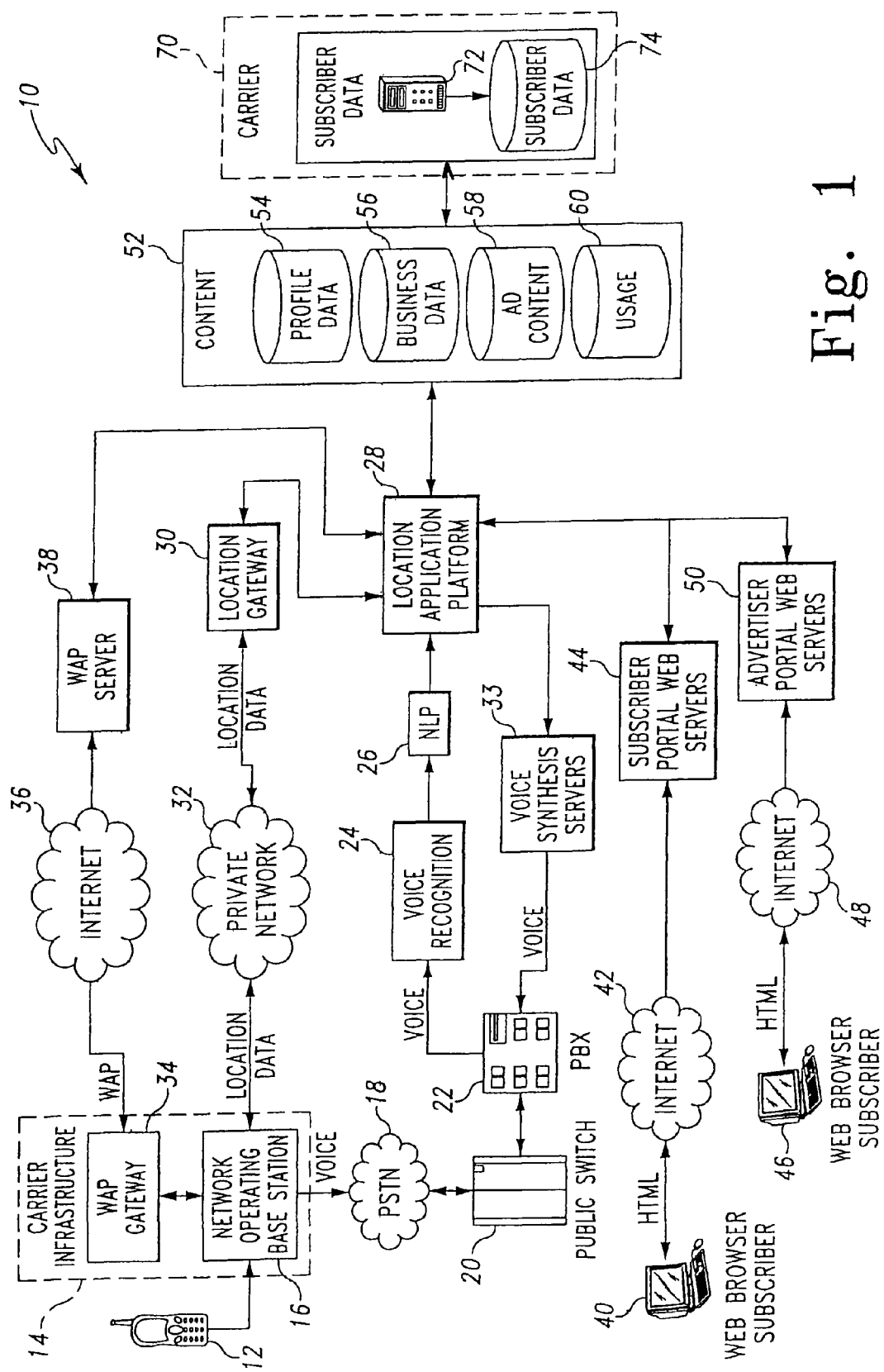
FIG. 1 illustrates a preferred embodiment of the location-based services system.

The present invention discloses a method and system for delivering location-based services through a variety of communication networks. Referring to FIG. 1, the preferred location-based services system 10 uses the geographic location of a remote terminal 12 to provide geographically targeted services to the remote terminal 12. Remote terminals 12 that subscribe to the location-based services system 10 are capable of selecting and receiving information from a broad range of business and service providers that are located in a geographic region that is close to the remote terminal 12 and, thus, the user.

As illustrated in FIG. 1, one preferred embodiment of the location-based services system 10 includes a remote terminal 12 that is connected to a wireless communication system 14 using one of several available and commonly used communication protocols. As illustrated, the remote terminal 12 is connected to a base station 16 of the wireless communication system 14, which transmits and receives radio signals to the remote terminal 12 during operation. Those skilled in the art would recognize that although only one base station 16 is illustrated in FIG. 1, several base stations 16 are actually used to make-up the preferred wireless communication system 14. Ideally, the preferred wireless communication system 14 would cover a wide geographic region, such as, by way of example only, the entire United States.

In the preferred embodiment of the present invention, the remote terminal 12 is capable of sending a digital input signal to the base station 16. The term digital input signal should be broadly construed to include voice signals, keypad input data, and pointer device selections or data from any other commonly used means for inputting data into a respective remote terminal 12. Those skilled in the art would recognize that several peripheral devices are available for various types of remote terminals 12 that could be used to input data into the remote terminals 12 and may be taken advantage of by the present invention.

Preferentially, the wireless communication system 14 is a digital communication system that uses one of several different methods of providing wireless digital communication between the remote terminals 12 and the base stations 16. The wireless communication system 14 can use frequency division duplexing (FDD) or time division duplexing (TDD) to allocate for the two directions of transmission between the remote terminal 12 and the base station 16.

In order to provide multiple access methods to the remote terminals 12, which refers to the method of creating multiple channels for each transmission direction, one of several different types of multiple access methods may be used in the present invention. Three preferred types of multiple access methods that might be used include: frequency division multiple access (FDMA); time division multiple access (TDMA); and/or code division multiple access (CDMA). Those skilled in the art would recognize that the present invention could readily be adapted to take advantage of other multiple access methods as well.

As further illustrated in FIG. 1, in the preferred embodiment of the present invention the base station 16 of the wireless communication system 14 is connected to a public switched telephone network (PSTN) 18 by a public switch 20. As known to those skilled in the art, the PSTN 18 is a worldwide voice telephone network that is used to allow various communication devices to communicate with each other. Although the preferred PSTN 18 is a digital system, the present invention may be adapted for use on analog systems as well to accommodate geographic regions that might be underdeveloped or not serviced by a digital system.

The public switch 20 transfers the signals that are received from the base station 16 to a private branch exchange (PBX) 22. The public switch 20 is connected to the private branch exchange (PBX) 22, which, as generally known in the art, is a telephone switching system that is used to interconnect various telephone extensions to each other. In the preferred embodiment of the present invention, the PBX 22 uses all-digital methods for switching and is capable of supporting digital remote terminals and telephones and analog remote terminals and telephones. As set forth in greater detail below, in the preferred embodiment, the PBX 22 is connected to a server of the location-based services system 10, which is a form of a digital remote terminal.

Referring to FIG. 1, in this embodiment of the present invention, the PBX 22 is connected to at least one voice recognition server 24. The voice recognition server 24 contains at least one voice recognition application that is operable to recognize the respective words that are contained in the voice signals that are received from the PBX 22. As set forth in greater detail below, a resulting output is generated by the voice recognition application that is used by a natural language processing application.

The voice recognition server 24 is connected to at least one natural language processing server 26 that includes at least one natural language processing application that processes the identified words contained in the voice signals to ascertain the meaning of the words that are contained in the voice signals. As such, during operation, the voice recognition server 24 identifies or recognizes the particular words that are contained in the voice signals and the natural language processing server 26 interprets the meaning of the recognized words of the voice signals that are originally generated from the remote terminal 12. The natural language processing application may be located on the voice recognition server 24 in other embodiments of the present invention, but, in an effort to increase the level of performance, would preferentially be located on a separate server or a separate set of servers.

The natural language processing server 26 is connected to at least one location-based application server 28. As set forth in detail below, the location-based application server 28 is programmed to provide responsive information to the remote terminals 12 that has been requested by a respective user of the remote terminal 12. Generally speaking, the location-based application server 28 is used to retrieve and pass on location-based information to the remote terminals 12 in various data formats. The type of information provided to the remote terminals 12 varies depending on the specific nature of the information that has been requested from the user and the geographic location of the remote terminal 12.

During operation, after the meaning of the words in the voice signals are interpreted, the natural language processing server 26 is programmed to create a structured request that is sent to the location-based application server 28. In response to the structured request, the location-based application server 28 generates a structured response that is sent to the remote terminal 12. As set forth in greater detail below, the exact nature of the information sent in the structured response depends on the specific request that is made by a particular user of the remote terminal 12.

If an analog voice signal is used, although not illustrated in FIG. 1, at least one digital signal processor server could be used to convert the analog signal into a digital signal that the voice recognition server 24 can process and interpret using the voice recognition applications. In this respective embodiment, the digital signal processor server is preferentially connected between the voice recognition server 24 and the PBX 22. Those skilled in the art would recognize that the voice recognition server 24 might also be designed to perform the functions of the digital signal processor server in other embodiments of the present invention.

Each remote terminal 12 also sends a unique remote terminal identifier to the base station 16 while communicating with the base station 16 of the wireless communication system 14. The remote terminal identifier is preferentially attached to each voice signal as it passes through the location-based services system 10 so that the system can keep track of which respective remote terminal 12 is supposed to receive the information that has been requested. Those skilled in the art would recognize that various identification methods might be used to keep track of specific remote terminals 12 using the location-based services system 10.

As further illustrated in FIG. 1, the location-based application server 28 is also connected to a location gateway server 30, which is, in turn, connected to the base station 16 of the wireless communication system 14. The location gateway server 30 is used by the location-based application server 28 to retrieve a geographic indicator that is associated with each respective remote terminal 12. As such, while a respective remote terminal 12 is connected to the wireless communication system 14, the location-based application server 28 is capable of determining the respective geographic location of the remote terminal 12 so that geographically targeted responses and information can be provided to the remote terminal 12.

As illustrated in FIG. 1, the location gateway server 30 is preferentially connected to the base station 16 of the wireless communication system 14 using a network connection 32, which may be a private network connection or an Internet connection in alternative embodiments of the present invention. The geographic indicator may be generated by the remote terminal 12 or the base station 16 and is preferentially transmitted to the location-based application server 28 when a user of the remote terminal 12 is accessing the location-based services system 10. The geographic indicator is preferentially transmitted to the location-based application server 28 with the remote terminal identifier so that the location-based application server 28 can associate each respective remote terminal 12 with a particular geographic location.

In the preferred embodiment of the present invention, the geographic indicator may be preset by a user of the remote terminal 12, automatically generated by a GPS located in the remote terminal 12 or generated by a specialized geographic determination application running on the base station 16. In addition, the present invention may advantageously take advantage of an enhanced 911 system of the wireless communication system 14 to generate the geographic indicator. In another embodiment of this invention, the geographic indicator may originate from a combination of these sources and/or systems (i.e. it could come from a GPS-assisted network that uses GPS and devices on the network). The geographic indicator may automatically be sent to the location-based application server 28 as soon as a respective remote terminal 12 connects to the wireless communication system 14; however, in alternative embodiments of the present invention, the geographic indicator is only sent when a respective remote terminal is sending a structured request to the location-based application server 28. As the geographic location of the remote terminal 12 changes, the geographic indicator is updated and the updated information can continuously be sent to the location-based application server 28.

As further illustrated in FIG. 1, at least one voice synthesis server 33 is connected to the location-based application server 28 and the PBX 22. For voice-related applications of the location-based services system 10, the voice synthesis server 33 is used to generate voice responses that are based on the structured responses that are generated in response to the structure requests that are received by the location-based application server 28. Voice synthesis applications on the voice synthesis server 33 are used to transform the structured responses into voice response. In the preferred embodiment, the PBX 22 is used to transmit the voice responses to the PSTN 18, which, in turn, transmits the voice response to the base station 16, which ultimately transmits the voice response on to the remote terminal 12. In alternative embodiments of the present invention, the voice synthesis server 33 may be connected directly to respective base stations 16 of the wireless communication system 14.

Referring once again to FIG. 1, in yet another preferred embodiment of the present invention, the remote terminal 12 is connected to the location-based application server 28 through a wireless application protocol (WAP) gateway 34 of the wireless communication system 14. The WAP gateway 34 is connected to a WAP server 38 of the location-based services system 10 through a network connection 36. The network connection 36 may be a private network connection or an Internet connection. The WAP server 38 is connected to the location-based application server 28 and, during operation, is used to generate structured requests, which are based on requests that are input to the remote terminal 12 and sent to the location-based application server 28.

The remote terminal 12 is capable of communicating with the WAP server 38 and the location-based application server 28 using a WAP standard. As known to those skilled in the art, the WAP standard is a protocol that is designed for wireless communication devices to provide secure access to e-mail and text-based web pages. WAP provides a complete environment for wireless applications that includes a wireless counterpart of TCP/IP and a framework for telephony integration. In the preferred embodiment of the location-based services system 10, the remote terminals 12 may also be capable of browsing for location-based services through the use of text and graphical based menus that can be provided to the remote terminals 12 from the location-based application server 28.

One preferred embodiment of the present invention uses the WAP standard to support the use of a Wireless Markup Language (WML), which is a streamlined version of HTML for small screen displays, to conduct communication and transfer information between the remote terminal 12 and the location-based application server 28. WAP is also capable of using WMLScript, which is a compact JavaScript-like language that is capable of running in limited memory on the remote terminal 12. The location-based services system 10 can also be designed to advantageously take advantage of this capability to provide location-based services to users of remote terminals 12 depending the particular geographic location of the remote terminal 12.

In this preferred embodiment of the present invention, the WAP standard supports various handheld input methods such as keypad inputs or pointer device inputs that may be generated on various different types of remote terminals 12. As it relates to the present invention, this gives users of the remote terminals 12 the capability of inputting data from keypads for the purposes of entering search requests to the location-based services system 10. In addition, the remote terminals 12 are capable of receiving, interpreting and displaying web pages that include hypertext links to other web pages that may be selected using various selection methods.

For the purpose of the present invention, the term wireless application protocol should be broadly construed to include any communication protocol similar to what is commonly referred to as the "WAP standard," which, as set forth above, is used to transmit text and graphics-based information to remote terminals 12. Although the WAP standard is used in this particular preferred embodiment of the present invention, those skilled in the art should recognize that other text and graphics-based communication protocols could be used in alternative embodiments of the present invention.

For example, although not specifically illustrated, another preferred embodiment of the present invention could be designed for an i-Mode wireless communication system. i-Mode wireless communication systems use a packet-based communication protocol to communicate between the remote terminals 12 and the base station 16, which essentially means that the remote terminals 12 are connected to the wireless communication system at all times and communicate with the base stations 16 using packets. i-Mode is also capable of providing web-browsing and customized applications to remote terminals 12.

i-Mode is a proprietary system that uses a subset of HTML, known as cHTML, in contrast to the WAP standard, which uses WML. In this particular embodiment, an i-Mode server is used to connect the base station 16 of the wireless communication system 14 to the location-based application server 28. The remaining details of this particular embodiment are similar to other embodiments of the present invention and, as such, a more detailed discussion is not necessary.

Referring to FIG. 1, in yet another preferred embodiment of the location-based services system 10, a second remote terminal 40 is connected to a subscriber portal web server 44 through a network connection 42. The network connection 42 may be a private network connection or an Internet connection. As illustrated, the subscriber portal web server 44 is also connected to the location-based application server 28. During operation, the second remote terminal 40 is programmed to receive structured requests that are sent to the location-based application server 28 and, likewise, the location-based application server 28 is programmed to generate structured responses that are sent to the second remote terminal 40.

The second remote terminal 40 and the location-based application server 28 preferentially communicate with each other using standard web-based protocols that are commonly used in various Internet-based applications. In this embodiment of the present invention, a user accesses the subscriber portal web server 44 through the second remote terminal 40, which is preferentially a computer workstation. As a subscriber to the location-based services system 10, the second remote terminal 40 is assigned a predetermined geographic indicator. The geographic indicator is used by the location-based application server 28 to target services and business content to the second remote terminal 40 that are based on the geographic location of the second remote terminal 40.

The user of the second remote terminal 40 may be given the option of setting the geographic indicator to a desired geographic location, which may or may not be the exact geographic location of the second remote terminal 40. For example, if the user is traveling to another city that evening and wants to access location-based services in that particular city, an option can be provided allowing the second remote terminal 40 to designate that particular city.

In this preferred embodiment of the present invention, the second remote terminal 40 is preferentially a computer workstation that includes multimedia capabilities and includes a microphone and a sound card. As known to those skilled in the art, this allows the second remote terminal 40 to generate sound through a speaker system and receive voice signals through the microphone. Although not specifically illustrated in FIG. 1, this could allow the subscriber portal web server 44 to be connected to the voice recognition server 24 so that voice signals sent from the second remote terminal 40 could be processed similar to the method used to process voice signals received from wireless remote terminal 12.

Referring to FIG. 1, a business remote terminal 46 is connected to a network connection 48 that is connected to an advertiser portal web server 50. The network connection 48 may be a private network connection or an Internet connection. The advertiser portal web server 50 allows various businesses (i.e., content providers) to add, modify and/or delete campaigns that are designed to promote and sell various products and services through the location-based services system 10. For example, if a particular business entity desires to run a promotion on a particular product or service, the advertiser portal web server 50 allows the business entity to modify their respective listings to include the respective items or services on special.

As further illustrated in FIG. 1, the preferred location-based services system 10 is also capable of leveraging data that is preferentially grouped in four logical data groupings 52. These logical data groupings include profile data files 54, business data files 56, additional data files 58 and usage data files 60. The data files 54-60 contain detailed information on various items and services that are used by the location-based services system 10, which is set forth in detail below. The data files 54-60 can be located on the location-based application server 28, but are preferentially maintained on separate servers.

The profile data files 54 contain a group of logical entities that contain relevant information concerning each consumer of the location-based services system 10. These logical entities include, but are not specifically limited to the following items: consumer name; consumer phone number; consumer identification; consumer password; consumer home address; consumer home phone number; consumer email address; consumer pager number; consumer service subscriptions (detailing the consumers chosen level of participation in one or more services); consumer privacy preferences (detailing information denoting the willingness to share a consumers private data with others based on data type, requestor, service, etc.); consumer service preferences (detailing any specific saved information that is relevant to any of the services which a consumer may use, such as: named locations (such as the address for a consumers work location, or the address(es) of a consumers friend(s); named interests or preferences regarding hobbies, news topic interest, sports, music, preferred brands or chains, banking information and other demographic information. (such as NBA basketball, Jazz music, Italian food, favorite clothing brands or chains, banking information, etc.)); and preferred asynchronous communication method (such as email or pager) listed by service and/or service/content provider.

The business data files 56 are composed of a group of logical entities containing all relevant information regarding the businesses listed within the location-based services system 10, including but not limited to: business name; business phone number; business text description; business audio description; business video description; business and/or product images; business identification; business password; business category or categories; advertising participation level; advertising campaign information such as: parameters that define target market; campaign identification code; advertising content and special deals/discounts; saved data mining/reporting parameters; brands sold; brands serviced; product types sold; product types serviced; product models sold; product models serviced; product model prices; and service prices and inventory list (by brand, product type and product model).

The additional data files 58 contains a group of logical entities that generally includes any additional content that is capable of being leveraged by the location-based services system 10, possibly including, but not limited to: business ratings (via external evaluation services); weather conditions; driving directions; maps; traffic Although not specifically illustrated, the residential telephone number and address listings may be provided by local telephone companies through a residential listing server that is connected to the location-based application server 28.

The usage data files 60 contains a group of logical entities that generally includes all recorded information regarding consumer transactions from remote terminals 12, 40, possibly including, but not limited to: consumer identification (or a unique hash of consumer identification); date; time; service used; request type; search criteria; matched data purchases made, and actions taken. Those skilled in the art would recognize that several other types of usage data might be stored in the usage data files 60.

As generally set forth above, users of the location-based services system 10 are given the ability to search, via a remote terminal 12, 40, for a business that will satisfy specific purchase or service requirements using multiple access methods (voice, wireless application protocol or web application protocol). The location-based application server 28 is programmed to handle a variety of structured requests and is capable of generating a variety of structured responses in the same format (i.e.—voice, wireless application protocol or web application protocol) that the structured request was received by the location-based application server 28.

Some of the structured request parameters that are capable of being used for the business services provided by the location-based services system 10 include (but are not necessarily limited to) one or more of the following: product type; service type; business name; business category; product name (or model name); product brand; price level; business or service ratings (i.e. external evaluation from a rating service such as AAA); whether special deals are provided; location (auto-location (locating nearest ATM for instance), predefined locations, or consumer-specified locations); hours of operation; availability of service (for example: availability of a open table at a specified time at a restaurant); and company specified within favorites for a category (i.e., name of favorite coffee house franchise). Those skilled in the art would recognize that a variety of structured request parameters might be used in the present invention.

Optionally, consumers have the ability to "opt-in" to "push" content and advertising services. Push services are defined as services, which proactively deliver content to the consumer through the remote terminal 12, 40, rather than services delivered only following a request by the consumer. As set forth above, the preferences of the consumers that use the remote terminals 12 are stored within the profile data files 54. As such, by way of example only, a consumer that likes golf may be "pushed" an offering as they travel close to a nearby golf equipment store relating to a special offer on an item such as a golf club or particular brand of golf ball.

As set forth briefly above, the location-based services system 10 also gives businesses the ability to manage their respective content and mine usage data by using the advertiser portal web server 50. The advertiser portal web server 50 preferentially includes the following web-based applications: a campaign management application, a business profile management application, a mining/reporting and predictive modeling application. Each of these applications and their respective functional aspects is discussed in greater detail below.

The campaign management application includes several applications that allow a business to create advertising campaigns and an edit/delete advertising campaigns. The create campaign capability enables an advertiser to create a location-based advertising campaign. As part of this capability, the business would define the market segment at which the advertising is targeted. Then, the advertiser would define the advertising content that would be delivered to the target market, as well as the mechanism of delivery (i.e. pushed to each consumers remote terminal 12, 40, or presented only to a consumer when they make a relevant enhanced directory assistance request/search). The edit/delete campaign capability allows the business to modify or delete an existing campaign that has already been created and is running on the location-based application server 28.

The business profile management application includes a create business listing capability and an edit business listing capability. The create business listing capability enables a business to define their respective set of business data (see above for a list of content within the business data). The edit business listing capability allows the business to modify or delete their business listing. Those skilled in the art would recognize that several other options might be made available through the business profile management application.

The mining/reporting capability allows business to interface with data that is stored in the usage data files 60. An advertising effectiveness interface utilizes the usage data files 60 and business data files 56 to generate analysis surrounding the effectiveness of location-based advertising campaigns. The analysis will address questions such as "How many people received my campaign in the downtown area of Atlanta". The information provided to the businesses provides them insight to quantify the results of campaigns created in the location-based services system 10 through the campaign management tool.

The predictive modeling capability provides forecasting for potential customers likely to respond to offers, listings and deals. Examples of the type of feedback the consumer will receive include (but not limited to) the following: identifying customers likely to respond to their campaign by customer segment; identifying customers likely to request a campaign or listing by customer segment; and identifying demands by peak time or day.

As briefly set forth above, the location-based services system 10 provides a consumer using a remote terminal 12, 40 with access to products and services in a designated geographic area through multiple access methods such as voice, wireless application protocols (such as WAP and cHTML) and web protocols (such as Java and HTML). The present invention encompasses the full lifecycle of the location-based services system 10 including delivery and maintenance, which includes content management, consumer management, content delivery, advertising management, advertising reporting, advertising delivery, usage tracking, usage mining and reporting, billing and settlements.

The preferred location-based services system 10 is capable of providing location-based services to consumers through remote terminals 12, 40 and is managed by various content providers through the use of respective business remote terminals 46. The services that are provided through the location-based services system 10 preferentially includes an enhanced directory assistance service and an enhanced business service that is delivered through a voice recognition capability, wireless application protocol capability and/or web application capability.

In order to access the enhanced directory assistance services or the business services, the user of the remote terminal 12 preferentially enters a predetermined key sequence (e.g.—by pressing 411) on the keypad of the remote terminal 12 or by pressing a specially designed key on the remote terminal 12. If the remote terminal is not connected to the base station 16 already, when the enhanced directory assistance services or business services are selected, the remote terminal 12 establishes a connection with the base station 16 of the wireless communication system 14, which acts as a gateway to the location-based services system 10.

In another embodiment, in order to select one of the respective services, the user of the remote terminal 12 is given the option of using voice commands, but as previously set forth may also use keypad inputs on the remote terminal 12 to select the desired services as well. Those skilled in the art should recognize that the enhanced directory assistance services and the business services do not necessarily have to be provided through the same access method and that a keypad-based menu system may be used until the appropriate time occurs for the user to input a voice signal containing a request for information.

By way of example only, if the enhanced directory assistance services are selected by a user of the remote terminal 12, either the base station 16, the location-based application server 28 or remote terminal 12 can be programmed to generate a search parameter request that is audibly generated on the remote terminal 12. In the embodiment being discussed, the search parameter request is sent in the form of a voice signal that prompts the user to state the first and last name of the person they are looking for. In addition, the search parameter request could also include an option that might prompt to user to also state the geographic area where the person is located. As should be apparent from the discussion above, since the location-based services system 10 includes voice recognition applications, those skilled in the art should recognize that the entire process of entering the search parameter request may be done by voice signals generated on the remote terminals 12.

In response to the search parameter request that is generated on the remote terminal 12, the user preferentially provides a vocal response to the remote terminal that is transmitted to the base station 16. The vocal response preferentially includes a first name response and a last name response (and possibly a detailed geographic information response for non-local listings) of the particular person the user is looking to retrieve information on. The vocal response to the search parameter request, which preferentially also includes a unique remote terminal identifier that is associated with each respective remote terminal 12, is then sent from the remote terminal 12 to the base station 16. The base station 16 transmits the voice response to the PSTN 18, which then routes the vocal response, together with the remote terminal identifier, to the PBX 22.

The PBX 22 transmits the vocal response and the remote terminal identifier as inputs to voice recognition applications and natural language processing applications that are located on servers 24, 26, which in turn, respectively transform the vocal response and the remote terminal identifier into a structured residential listing request that is sent to the location-based application server 28. As set forth in detail above, the voice recognition applications analyze the vocal responses for the purposes of making a determination of the identity of particular words contained in the vocal responses. Any detailed geographic information provided by the user is also added to the structured residential listing request that is sent to the location-based application server 28.

Figure 2:
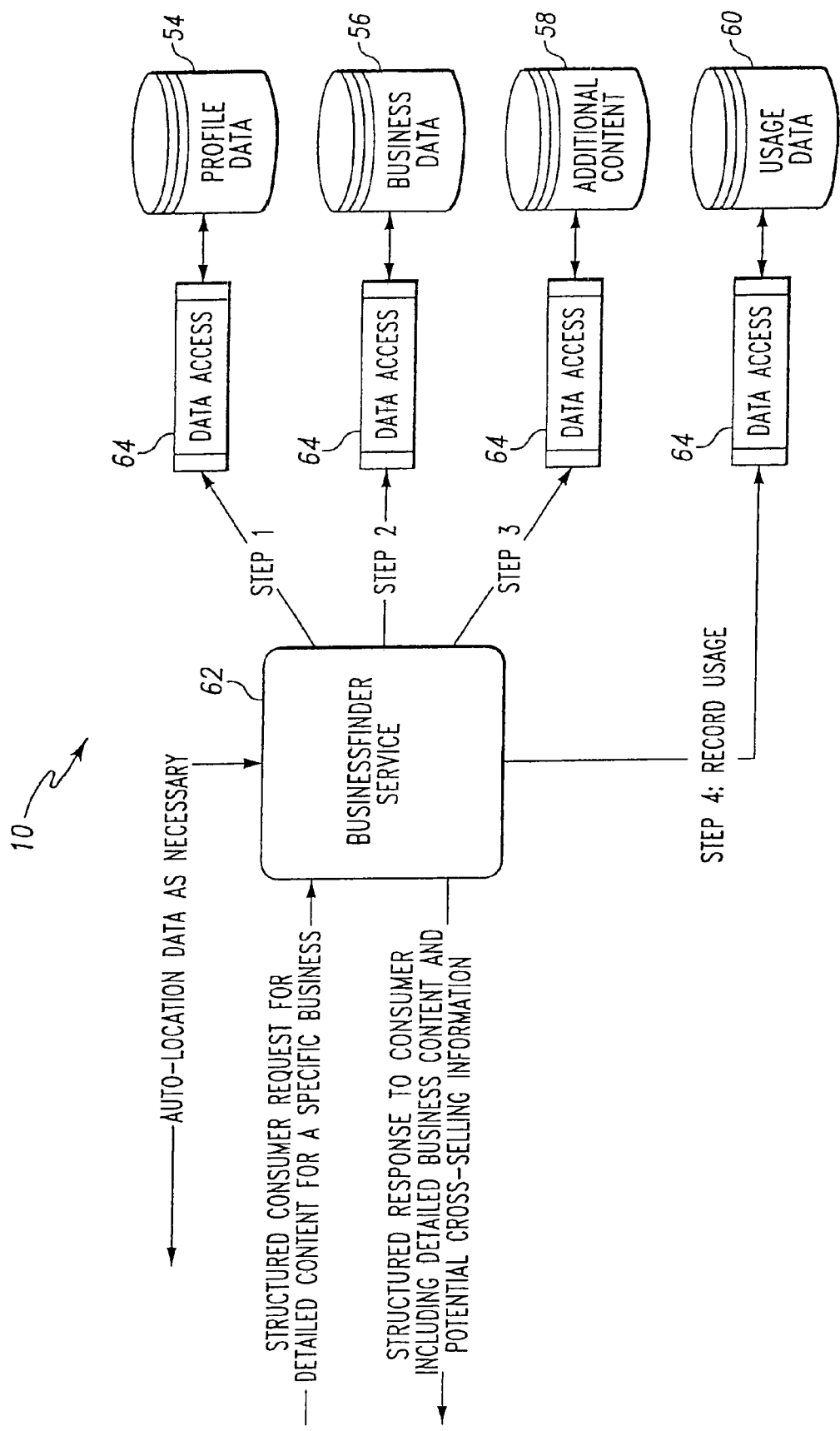
FIG. 2 is a flow chart illustrating the process steps performed by the location-based application server when processing structured requests.

As illustrated in FIG. 2, the structured residential listing request is used as an input to a residential finder application 62 located on the location-based application server 28. During operation, the residential finder application 62 interprets the structured residential listing request and uses at least one data access routine 64 to locate and retrieve the specific information requested by the structure residential listing request from a respective database file 54-58. Those skilled in the art should recognize that several database servers may be connected to the location-based application server 28 that are used to store various forms of information and content that is provided to users by the location-based services system 10 in varying types of formats, which will be set forth in greater detail below.

In the preferred embodiment of the present invention, the residential finder application 62 matches up the structured residential listing request with the geographic indicator of the remote terminal 12. If no geographic information is contained in the structured request, the residential finder application 62 conducts a search of the profile data files 54 and the additional data files 58 with data access routines 64 targeted within a predetermined area based on the geographic location of remote terminal 12. If geographic information is included in the vocal response, the residential finder application 62 conducts a search within the geographic area specified by the user. As set forth above, in the preferred embodiment of the present invention the residential listing database files are stored under the additional data files 58 by way of example only and should not be construed as a limitation of the present invention.

The residential finder application 62 preferentially also searches the profile data files 54 so that if the identity of the person contained in the structured residential request is identified as a subscriber of the location-based services system 10, a remote terminal 12 telephone number and/or an email address may also be added to the response that is provided to the user requesting the desired information. If the located person does turn out to be a subscriber of the location-based services system 10, other embodiments of the present invention allow the subscriber to create a personalized response that is stored in a database file and is provided in response to residential listing requests that identify them.

In addition to receiving the structured residential listing requests, the residential finder application 62 obtains a geographic indicator and a remote terminal identifier associated with the remote terminal 12. This allows the system to default to the geographic location of the remote terminal 12 to conduct the search, as set forth above. For instance, if the remote terminal 12 is located in Atlanta, Ga., the residential finder application 62 will know this from the geographic indicator and will only search listings in the Atlanta area.

Once the appropriate data is located by the residential finder application 62 that is responsive to the structured residential listing request, which in the present example would preferentially include at least one telephone number and/or the address of the person(s) named in the voice signal, the residential finder application 62 is operable to generate a structured residential response that is sent to voice synthesis server 33. As set forth in detail above, the voice synthesis server 33 is programmed to transform the structured residential response into a voice response signal with voice synthesis applications located on the voice synthesis server 33.

As set forth briefly above, the voice response that are generated by the voice synthesis server 33 can include the name, address, residential telephone number, mobile number and/or email address of the particular person for which the user has requested a residential listing. For those instances where the structured residential responses include more than one residential listing, the residential listing finder application 62 is preferentially programmed to generate a structured residential response that provides the multiple listing results in a predetermined organized listing arrangement.

The predetermined organized listing arrangement is preferentially set up so that the user of the remote terminal 12 is capable of interacting with the listings provided in the voice response through the use of a keypad input or by voice signals that are spoken into the remote terminal 12 by the user. Preferentially, the information is organized and presented to the user of the remote terminal 12 based on the address of the particular people identified by the residential finder application 62, however, those skilled in the art would recognize that other alternatives of presenting and organizing the results exist (i.e.—ranking the results in geographic order) are capable of being used in varying embodiments of the present invention.

If the person for whom information has been requested is designated as being unlisted or unavailable, the location-based application server 28 is preferentially programmed to generate a structured residential response that contains a message that indicates that the requested information is unlisted or unavailable. As such, in this particular embodiment of the present invention the location-based application server 28 sends the structured residential response to the voice synthesis server 33, which generates a voice signal that is sent to the remote terminal 12 informing the user that requested the residential listing that the requested residential listing it unlisted or unavailable.

As briefly set forth above, another preferred embodiment of the location-based services system 10 is capable of providing business services to the remote terminal 12, which are provided to the remote terminal 12 based on the geographic location of the remote terminal 12. If the user of the remote terminal 12 selects the business services option instead of the enhanced directory assistance services option, a variety of information services are capable of being delivered to the user through the location-based services system 10. During operation, the business services are provided to the remote terminal 12 through similar access methods that the residential listing services are provided to the remote terminal 12. In addition to being able to obtain the address and telephone number of local businesses, various other forms of business information is capable of being transmitted to the remote terminal 12 by the location-based services system 10.

As generally set forth above and in greater detail below, some of the preferred structured business request parameters that are capable of being processed by the business services of the location-based services system 10 include (but are not necessarily limited to) one or more of the following parameters: product/service types; business names; business category; product name (or model name); product brands; price level; business or service ratings (e.g.—external evaluation from a rating service such as AAA); whether special deals or offers are being provided; auto-location of predefined services (e.g.—locating the nearest ATM for instance); hours of operation; availability of service (e.g.—availability of a open table at a specified time at a restaurant); and/or business information specified within a user defined favorites category (e.g.—name of favorite coffee house franchise, favorite clothing brands, favorite restaurants).

In this preferred embodiment of the present invention, once a user of the remote terminal 12 gains access to the business services provided by the location-based services system 10, they are prompted by a voice signal requesting the user to state their respective business request. In response to the prompt for a business request, the user states a vocal response that is received by the remote terminal 12 that contains a predetermined request for a predetermined type of business content. The exact nature and content of the vocal response will vary, depending on the specific type of business/service information that is being requested by the user of the remote terminal 12. As set forth above and below, the preferred embodiment of the present invention includes natural language processing applications the are used to interpret the meaning and context of the words contained in the vocal response, thereby allowing the user of the remote terminal 12 to make a request using requests that are spoken using statements commonly used in everyday conversations.

By way of example only, lets say that a respective user of the remote terminal 12 wants to obtain business information related to determining the location of a favorite local fast-food restaurant. As such, the user's vocal response that is received by the remote terminal 12 might contain a voice signal that includes a request for business information that could be phrased something along the lines of the following statement: "What is the address of a Burger King restaurant that is close to my present location?" As previously set forth, this preferred embodiment of the present invention is capable of interpreting this request using natural language processing applications to generate a structured response.

As with the residential services, in this embodiment of the present invention the vocal response that is provided by the user of the remote terminal 12 is transmitted from the remote terminal 12 to the base station 16 of the wireless communication system 14, which in turn is operable to transmit the vocal response to the PSTN 18 that transmits the vocal response to the PBX 22. The vocal response is then sent from the PBX 22 to the voice recognition server 24 where it is processed with voice recognition applications to determine the identity or recognize the respective words that are contained in the vocal response from the user containing a business information request. Although not illustrated, in an alternative embodiment of the present invention the base station 16 is directly connected to the voice recognition server 24, thereby allowing the base station 16 to directly transmit vocal response to the voice recognition server 24.

After the words contained in the vocal response have been recognized using voice recognition applications, a respective output is generated by the voice recognition applications, which is used as an input to natural language processing applications. As set forth in detail above, the natural language processing applications determine the meaning and context of the words contained in the vocal response that is received by the remote terminal 12. Referring once again to FIG. 2, once the meaning and context of the recognized words contained in the vocal response have been determined, the natural language application is programmed to generate a structured business request that is sent to the location-based application server 28. The location-based application server 28 includes at least one business/services finder application 62 that is operable to process the structured business request by retrieving the requested information.

As set forth in detail above, the remote terminal 12 also sends a remote terminal identifier with the vocal response that is preferentially integrated in some manner with the structured business request that is ultimately generated and sent to the location-based application server 28. In addition, in this preferred embodiment of the present invention as well as others, a geographic indicator and a remote terminal identifier associated with the respective remote terminal 12 making the structured business request is also obtained or has already been obtained by the location-based application server 28. As illustrated in FIG. 2, the geographic indicator and the structured business request are used by the business/services finder application 62 to generate a structured business response that is responsive to the structured business request.

In our current example, the preferred business/services finder application 62 uses the geographic indicator of the remote terminal 12 to determine which particular Burger King location is closest to remote terminal 12. A mapping routine within the business/services finder application 62 compares the geographic location of the remote terminal 12 with the respective geographic locations of Burger King restaurants retrieved by the structured business request and makes the determination of which location is closest to the remote terminal 12, which can be based on the distance of the remote terminal 12 from each respective location. As illustrated in FIG. 2, this is accomplished by a data access routine 64 that accesses the appropriate information from the business data files 56, which preferentially contains a database of business listings, addresses, products and/or services provided.

After the appropriate information is located, the location-based application server 28 is programmed to generate a structured business response that is sent to the voice synthesis server 33. The voice synthesis server 33 converts the structured business response into a voice signal that is then sent to remote terminal 12. In this example, the structured business response would contain the address of the Burger King that is closest to remote terminal 12, which has been determined by the location-based application server 28 based on the geographic location of remote terminal 12.

In yet another example of this embodiment of the present invention, a user of the business services might request information on a retail store that sells a specific product or provides a specific service. For instance, a user might state: "Who sells or provides product/service (stating the particular product/service desired)?" After the voice recognition application and the natural language processing application interpret and transform the request into a structured business request, the business/services finder application 62 uses the geographic indicator of remote terminal 12 to narrow the structured business request to retrieve business information contained within a predefined geographic area in which the remote terminal 12 is located. If more than one business sells the item or provides the requested service, the business/services finder application 62 is programmed to generate a structured business response that is sent to voice synthesis server 33 containing a listing of the respective businesses meeting the desired criteria.

In yet another preferred embodiment of the present invention, the user is able to access the location-based services system 10 by using a wireless application protocol to generate and transmit structured requests to the location-based application server 28. A user of remote terminal 12 uses a keypad or some other equivalent input means to access the location-based services system 10 from a selection menu that is generated on a display of remote terminal 12. In this preferred embodiment of the present invention, once a user chooses to obtain access to the location-based services system 10, the remote terminal 12 is preferentially programmed to display a selection menu that contains a link to the business services and residential listing services provided by the location-based services system 10. Those skilled in the art would recognize that various predefined links and menu selections for various types of services may also be displayed that may or may not be specified by the user of remote terminal 12.

If the residential listing service is selected on the remote terminal 12, the user is prompted by remote terminal 12 to enter the first and last name of the person for which they desire to obtain information. By default, the remote terminal 12 is preferentially programmed to search for a listing that is contained in the immediate geographic location of the remote terminal 12. For example, if remote terminal 12 is located in the Atlanta metropolitan area, the search will be preset to be conducted using the Atlanta residential listings database. In alternative embodiments of the present invention, an additional input area is provided on the display of the remote terminal 12 whereby the user may designate the particular geographic location to search (i.e.—a city and state input location). As apparent, this allows the user to vary the location searched based on user preferences thereby providing further benefits to the user.

An additional item the remote terminal 12 is programmed to generate on the display is an icon or a selection area that is designated to cause the remote terminal 12 to transmit the search request, which contain the parameters that have been input by the user, to the base station 16 of the wireless communication system 14. As previously set forth, preferentially the search request is sent to the base station 16 using a wireless application protocol, which for the purpose of the present invention should be broadly construed to include a broad range of standards used by various wireless communication systems 14. The remote terminal 12 also transmits a remote terminal identifier with the search request, which as previously set forth, is assigned to remote terminals 12 for identification purposes. Once received by the base station 16, the search request is directed to the WAP gateway 34, which in turn, is preferentially programmed to transmit all search requests that are received by users accessing the location-based services system 10 to the WAP server 38.

The WAP server 38 is programmed to interpret the search request and generate a structured residential request that is sent to the location-based application server 28. For identification purposes, the remote terminal identifier is also transmitted to the location-based application server 28 with the structured residential request. As with other embodiments of the present invention, the location-based application server 28 is programmed with a residential finder application 62 that uses one of several data access routines 64 to obtain the requested information from a respective database file 54-58. A structured response is then sent to the WAP server 38, which in turn transmits the structured response to the WAP gateway 34 and ultimately on to the remote terminal 12.

If the business services option is selected, the remote terminal 12 prompts the user for a search request, which the user enters on the remote terminal 12. The search request is then sent to the location-based application server 28, in a similar fashion as described with the directory assistance services, where it is processed by a business/services finder application 62. The business/services finder application 62 uses data access routines 64 to retrieve the desired information and generates a structured response that is based on the geographic location of the remote terminal 12.

For example, if the remote terminal 12 is located on the upper north side of Atlanta, Ga., the location-based application server 28 will be informed of this fact by receiving a geographic indicator from the second remote terminal 12 and will be operable to generate structured responses to structured requests that contain information that is targeted for that particular geographic location. For instance, if a user of the remote terminal 12 enters a search request for information on "Chinese restaurants running specials", a structured response is generated by the business/services finder application 62 that provides information about Chinese restaurants on the upper north side of Atlanta, and not Chinese restaurants located in irrelevant geographic locations, such as the far south side of Atlanta.

As previously set forth, in yet another preferred embodiment of the location-based services system 10 a user of the second remote terminal 40 is connected to a subscriber web portal server 44. The second remote terminal 40 and the subscriber web portal server 44 are designed to communicate with each other using standard web-based protocols (e.g.—HTML). The subscriber web portal server 44 is connected to the location-based application server 28, thereby providing the second remote terminal 40 with access to the business services and enhanced directory assistance services that are offered in the preferred embodiments of the present invention.

The second remote terminal 40 is capable of providing voice or keypad input data to the subscriber web portal server 44. As previously set forth, for voice signals the respective vocal responses are sent to the voice recognition servers 24 for processing and, in the case of keypad input data, the subscriber portal web server 44 is operable to generate structured requests in response to user requests received from the second remote terminal 40 in similar manners as set forth above. The preferred location-based services system 10 is capable of allowing its subscribers to take advantage of the services provided by the present invention in a non-wireless environment as well, by supporting the use of standard computing devices that are typically used at home or work.

As such, by way of example only, lets say a user of the second remote terminal 40 is located in Atlanta, Ga., and wants to find local deals on Polo merchandise as well as stores that carry this particular brand that are located near their respective geographic location. In the case of a keypad input search, the user would be prompted for a search request from a web page generated on the second remote terminal 40 where they would enter their desired search parameters, which in the present example might be in the form of the words "POLO MERCHANDISE".

After the search request is entered and the user is ready to send the request, there is also preferentially an icon or some other type of selection indicator that is generated on a web page being displayed on the second remote terminal 40 that allows the user to submit the request. Once this is selected, the search request, a second remote terminal identifier and a geographic indicator are sent to the subscriber web portal server 44. The subscriber web portal server 44 then transforms the search request into a structured search request that is sent to the location-based application server 28, which processes the structured request similar in other embodiments of the present invention.

In the case of a voice signal input being used, the user would be prompted to state their respective request much like in the example set forth above with relation to wireless remote terminal 12. As such, in the case of our present example, the user would state "POLO MERCHANDISE" after being prompted for a business services request. This vocal response is sent to the voice recognition server 24, which as previously set forth, processes the vocal response similar to other embodiments herein described.

As such, in our present example, a user of the second remote terminal 40 would be provided with a structured response from the location-based application server 28 that contained information relating to businesses that sell Polo merchandise in a geographic location that is relatively close to the second remote terminal 40. In fact, in every embodiment of the present invention, the user may also be given option of selecting a predetermined geographic radius for which they wish responses to be generated during operation. By way of example only, a respective user may only desire to obtain information on businesses located within 15 miles of the remote terminals 12, 40 and as such, may set a setting provided on the remote terminal 12, 40 that only allows responses to business services requests to be generated within a 15 mile radius of the remote terminal 12, 40.

Referring once again to FIG. 1, a wireless carrier 70 may also be connected to the data files 54-60 through a wireless carrier server 72. The wireless carrier server 72 is preferentially operable to monitor the data that is contained in the data files 54-60. As such, during operation of the location-based services system 10 the wireless carrier server 72 can update a subscriber data file 74 as users of the remote terminals 12, 40 access the location-based services system 10. This allows the wireless carrier 70 to keep track of the usage of the location-based services system 10 and may allow various charges to be applied to the user if applicable.

Referring to FIG. 1, in yet another preferred embodiment of the present invention consumers are provided the ability to search via a remote terminal 12, 40 for a business that will satisfy specific purchase or service requirements via multiple access methods, which as set forth above may include using voice commands, wireless application protocols or web application protocols. The consumers are allowed to search for products, which as used herein shall refer collectively to goods and services. Based upon the parameters included in the search query or structured request that is input by the consumer, the location-based services system 10 will identify and respond to consumer requests with the most appropriate matches. Likely, these matches will preferentially include special offers or deals that are used by advertisers to attract potential consumers to purchase their respective products, services or visit their business locations.

Figure 3:
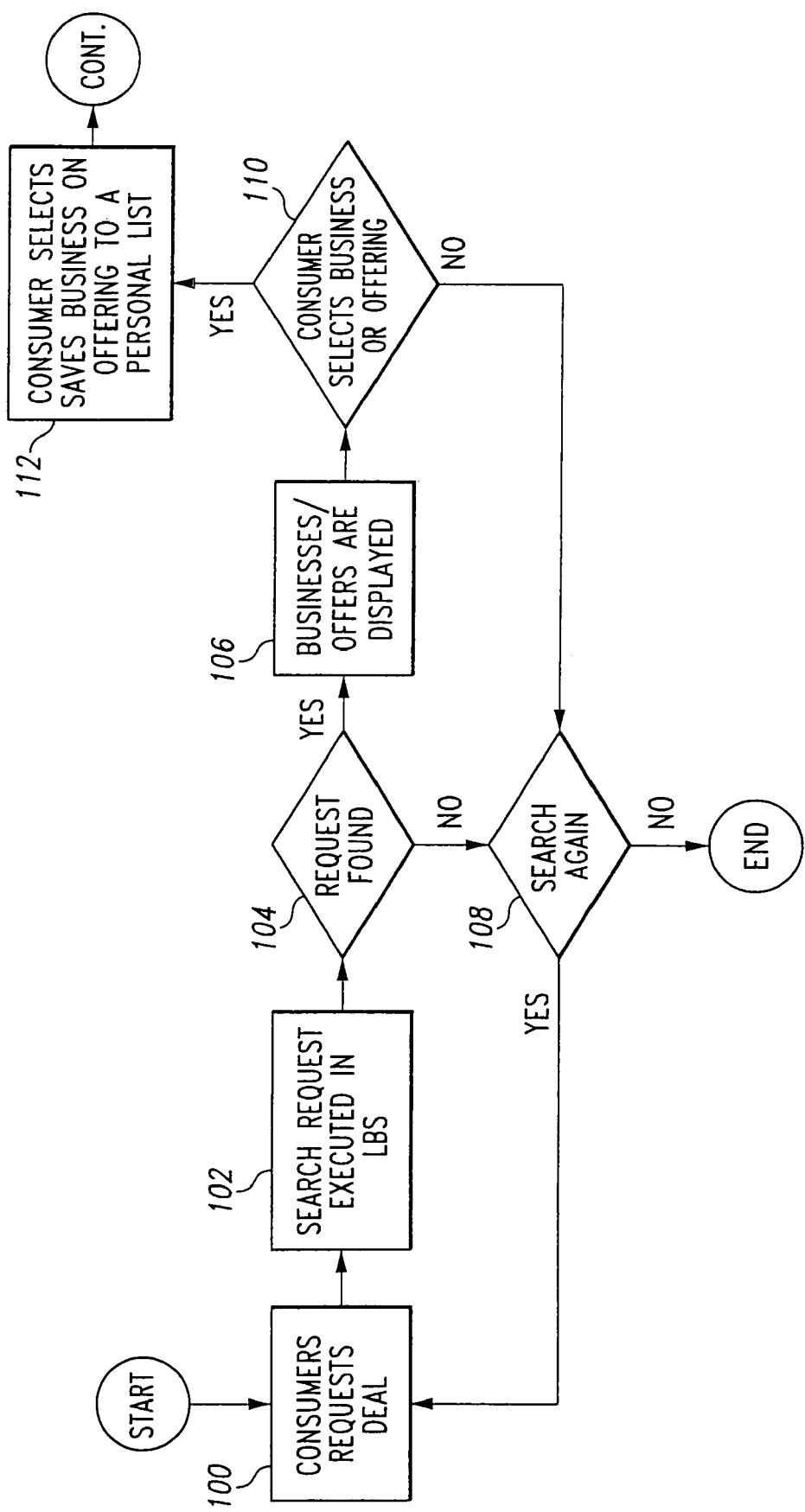
FIG. 3 illustrates a preferred method of tracking offerings and purchases in the location-based services system.

Referring to FIG. 3, depending on the access method used, at step 100 the consumer uses his or her remote terminal 12, 40 to submit a request or query for a deal on a particular product or service using the location-based services system 10. The search request is then processed by the location-based services system 10, which is represented at step 102. At step 104, the location-based services system 10 determines if a valid search result is found in response to the search request. If a valid search result is generated by the location-based services system 10, the search result is then sent to the consumer and displayed on the remote terminal 12, 40, which is illustrated at step 106. If no valid search results are obtained, the consumer is prompted to either enter another search by being allowed to refine their search or they are allowed to exit the location-based services system 10, which is represented at step 108.

As previously set forth, if a valid search result is obtained the search results are displayed on the remote terminal 12, 40. The consumer is provided with the ability to review details about each of the matched listings using the remote terminal 12, 40. As set forth above, the listings preferentially include special deals or offers that are responsive to the consumer's input. For illustrative purposes only, let's say a consumer enters a search request such as: "Who has a dinner special near my present location tonight?" In response to this search request, the location-based services system 10 might generate a response such as "The Tavern Restaurant and Bar in downtown Atlanta is offering you $15 off of your total dinner purchase of $40 or more with the use of your American Express Card for your dinner purchase. Please mention offer 10789." Of course, more than one response or offer may be presented in a menu format on a display of the remote terminal 12, 40 or in the case of voice commands, the consumer may use keys or another input device on the remote terminal as well as voice commands to select offers that are presented in a list or menu format by the voice synthesis server 33.

During operation, when consumers make search requests the information contained in each search request is preferentially captured and stored in the usage data files 60 within the location-based services system 10. The response that is generated to each search request is also captured and stored for tracking purposes. The information that is captured and stored in the usage data files 60 may include, but is not necessarily limited to the following: a campaign number or identifier, a merchant name, a consumer name (or encoded id), a consumer wireless number (or encoded id), a campaign code, a date, a time, a geographic location of the consumer when making the request, and an offer number.

After the businesses or offers are displayed to the consumer, the consumer is provided with an option of selecting a particular business listing or offer at step 110. If the consumer does not select a particular business listing or offer they are provided with the ability to either conduct another search, which is represented at step 108, or exit the location-based services system 10. If the consumer selects a business listing or offer in the list that is presented to the user, then the location-based services system 10 saves the business listing or offer to a personal list that this associated with the consumer in the usage data files 60, which is represented at step 112. The location-based services system 10 also saves the information about the consumer's selection in usage data files 60 that are associated with the selected business so that the selected business can be notified about the consumer's purchase or request.

Figure 4:
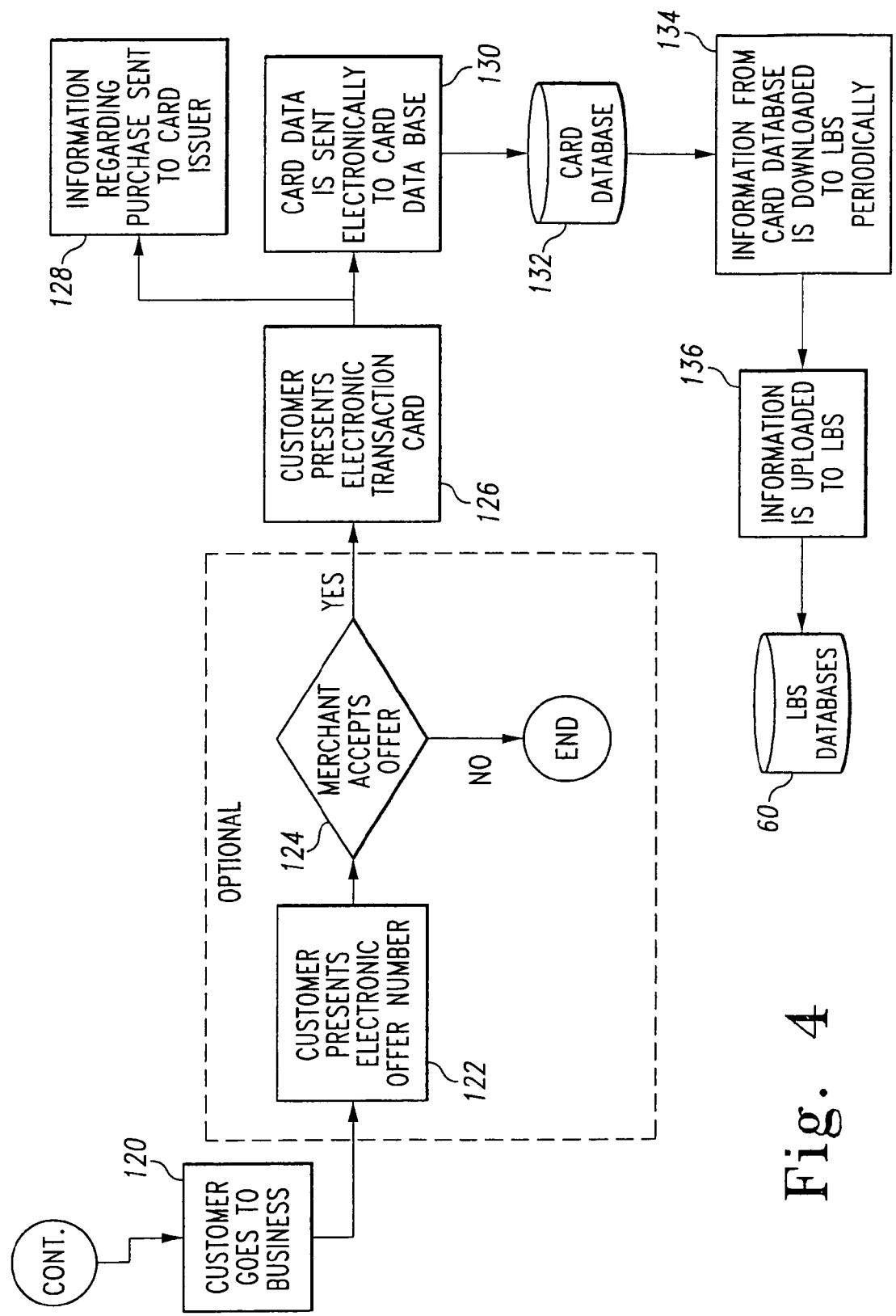
FIG. 4 illustrates a preferred method of completing transactions and storing data about said transactions.

Referring to FIG. 4, in one preferred embodiment of the present invention the consumer would go to the place of business that made the offering or appeared in the business listing that is presented to the consumer, which is represented at step 120. When applicable, at step 122 the consumer presents the offer number to the business that is generated at the time of the initial interaction on the location-based services system 10. At step 124, the business would then validate the offer number if provided or necessary by looking up information associated with the offer number on the business remote terminal 46. In order to validate the offer, the business remote terminal 46 accesses the usage data files 60 to determine the exact nature of the offer and what service or product should be provided to the consumer based on that offer.

After the offer number has been approved, the consumer then completes the purchase process by paying for the item with a designated electronic payment card, which is represented at step 126. When the consumer completes the purchase transaction via an electronic payment card, the information is captured and is sent to the card issuer for payment at step 128. At this point, the business is paid for its respective goods or services and the consumer is able to receive their respective goods or services. In alternative embodiments, the entire transaction can be completed by remote terminals 12, 40, especially in instances that do not require a visit to a business location by the consumers.

As illustrated at step 130, the location-based services system 10 also sends the card data within a card data file, preferentially in a periodic batch process, to a card database 132. The card data is then downloaded by the location-based services system 10 from the card database 132 at step 134 and then uploaded into the usage data files 60 at step 136. Key information found within the electronic card data include, but are not necessarily limited to, the following: card number, merchant code, merchant name, address of merchant, transaction type, name of consumer items or services purchased, amount of purchase, date of purchase, and time of purchase.

Referring to FIG. 3, although not specifically illustrated, once the consumer selects the business listing offering at step 112, the consumer could also arrange to have the product or service delivered or provided at a predefined address. Some products or services that are purchased using the location-based services system 10 may not require the consumer to travel to the business location in order to complete the transaction. However, it is envisioned that most consumers will be traveling to the business location to complete the transaction, such as finding a restaurant that is running a dinner special or a store running a special on a particular item in the geographic location of the consumer.

Figure 5:
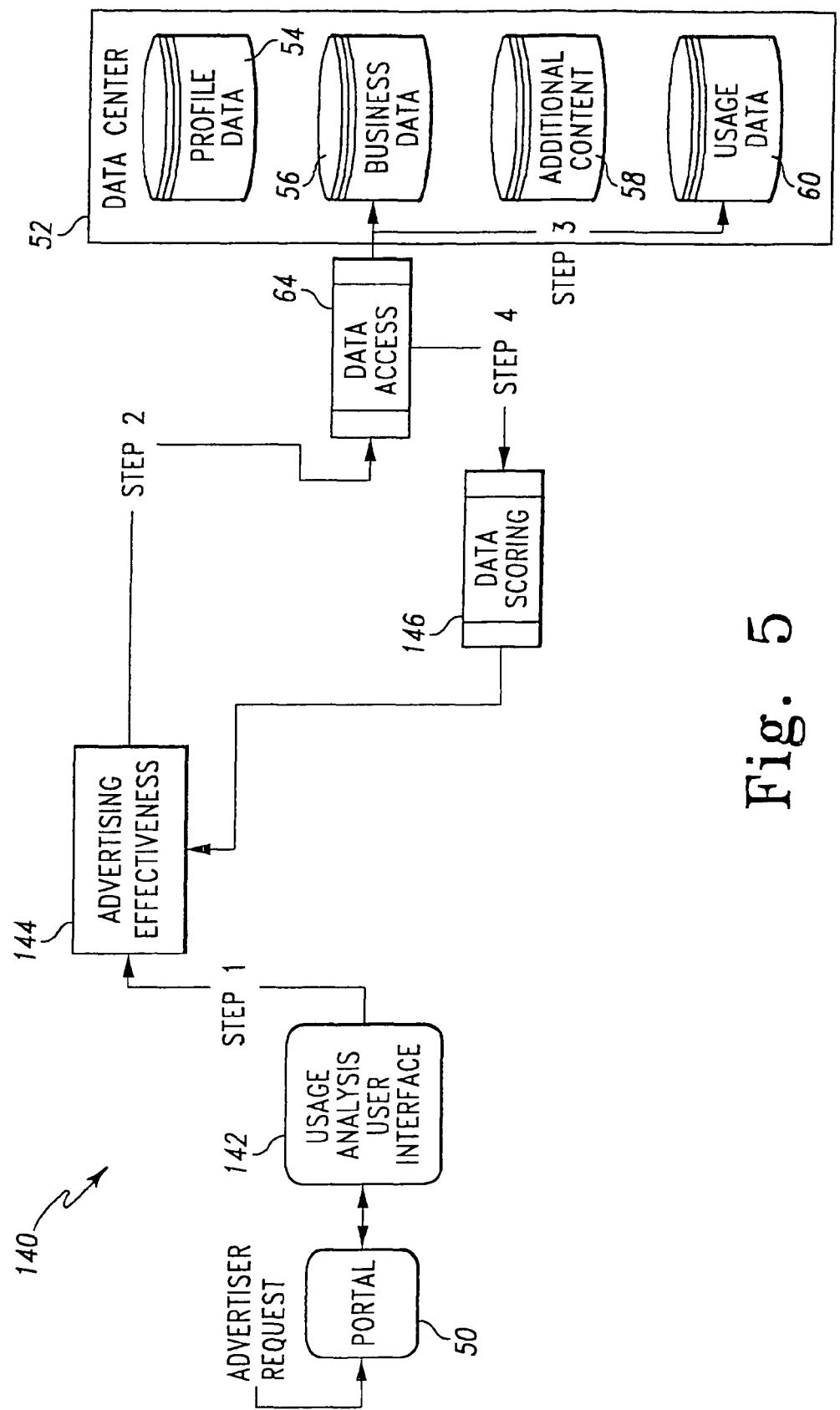
FIG. 5 illustrates a preferred advertising effectiveness application.

Referring to FIG. 5, the preferred steps performed by an advertising effectiveness application 140 are illustrated in FIG. 4. The advertising effectiveness application 140 utilizes the business data files 56 and the usage data files 60 in the location-based services system 10 to generate analysis surrounding the effectiveness of location-based advertising campaigns. The analysis is capable of addressing questions such as "How many people received my campaign in the downtown area of Atlanta?" The information provided to advertisers provides them with insight to quantify the results of advertising campaigns created with the location-based services system 10.

The user must first determine and enter the input variables that will be used for searching, which is preferentially done via a web-based interface using the business remote terminal 46. Once a search query is entered, it is used to retrieve and view the data stored in the business data files 56 and the usage data database 60. The advertising effectiveness application 140 retrieves data from the business data files 56 and the usage data database 60 to match request parameters that are input by the user. The advertising effectiveness application 140 will then forward the search results to a usage analysis user interface 142, which displays the resulting search response via the web browser on the business remote terminal 46.

Referring to FIG. 4, during operation a user of business remote terminal 46 receives a search query entry form from the usage analysis user interface 142. The search query entry form is preferentially generated from an advertising effectiveness routine 144 that is associated with the usage analysis user interface 142. Once a user enters search parameters into the fields on the query entry form, a search request is sent from the business remote terminal 46 to the advertiser portal 50. The search request is then directed to a data access component 64, which searches the business data file 56 and the usage data files 60 to retrieve search results that match the criteria set forth in the search request. The search results may then be directed toward a data scoring application 146, which is capable of reformatting the search results into various different types of data formats.

As illustrated in FIG. 1, in the preferred embodiment of the present invention the content files 52 are located on the location-based application server 28. As such, although not specifically illustrated, the advertising effectiveness application 140 may have to access the location-based application server 28 to retrieve the desired information. In addition, the data access component 64 is preferentially located on the location-based application server 28. As such, the advertising effectiveness application 140 preferentially generates search requests that are transmitted to the data access component 64 which in turn, actually performs the searching on the location-based application server 28. However, in other preferred embodiments of the present invention the content files 52 could be mirrored on the advertiser portal 50 and all processes could be performed at that location as well.

Once the search results are placed in the proper format, the advertising effectiveness routine 144 uses the usage analysis user interface 142 to generate a viewable output on the business remote terminal 46. Preferentially, the results are provided using a web browser on the business remote terminal 46; however, other ways of providing the results may also be used. The search results may be displayed using numbers, graphs, charts, images or any other method for providing analysis results.

A list of inputs (at a minimum) that may be used within the advertising effectiveness application 140 include, but are not necessarily limited to: a respective advertising campaign, demographic information, a date or time period, location information, by category, type of listing category, competitive listing categories and a key word inputs. Examples of the type of feedback the user will receive include (but are not necessarily limited to) the following: measure of number of customers reached; frequency of advertisement or listing; competitive analysis comparing advertising listing frequency to category; cost per impression; number of customers reached by top three demographic segments; and 1) demographics (gender, age, ethnicity, marital status, children, income, special interests, hobby, education, homeowner, car owner); 2) target market (city and state); and 3) location (address and location at time of historical interaction).

In order for the merchant/advertiser to determine the campaign or deal offering success, the advertiser will access the advertiser portal 50 within the location-services system 10. The advertiser will then use the usage analysis user interface 142 and the advertising effectiveness routine 144 to determine how many people responded to the deal or special offer.

Selecting and submitting information to a search query allows businesses to explore and search the advertising campaign data stored in the business content database 52. The location-based services system 10 retrieves data from the usage data files 60 to match the request parameters input by the user. The system will then display the resulting response via the web browser. Examples of the type of feedback the user will receive include (but not limited to the following: measure of number of customers reached, amount of tracked sales, number of tracked sales, competitive analysis comparing advertiser listing sales to category sales, cost per sale, total sales reached by top 3 demographic segments, demographics (i.e.—gender, age, ethnicity, marital status, children, income, special interests, hobby, education, homeowner, car owner), target market, city, state, location, address, and location at point of interaction.

While the invention has been described in its currently best-known modes of operation and embodiments, other modes, embodiments and advantages of the present invention will be apparent to those skilled in the art and are contemplated herein.

What is claimed is:

1. A location-based services system, comprising:
a location-based application server;
a wireless mobile terminal in communication with the location-based application server, wherein the wireless mobile terminal is responsive to a product information request generated by a user of the wireless mobile terminal to generate a request for information for a product, the request for information comprising the product information request, a mobile terminal identifier, and a geographic indicator of the wireless mobile terminal;
the location-based application server operates to receive the request for information, process the request for information, and retrieve geographically relevant information for the product;
wherein the location-based application server further operates to identify geographic information specified by the user within the product information request, and to retrieve the geographically relevant information to coincide with the geographic information specified as part of the product information request;
the location-based application server further operates to default to the geographic indicator of the wireless mobile terminal in the absence of geographic information specified by the user within the product information request, and to retrieve the geographically relevant information to coincide with the geographic indicator; and
the location-based application server further operates to generate and transmit to the wireless mobile terminal a response to the request for information for the product that includes the geographically relevant information.

2. The location-based services system of claim 1, wherein the location-based application server further operates to identify a business with merchandise or services that will satisfy the request and that is geographically proximate to the geographic information.

3. The location-based services system of claim 2, further comprising data files accessible with the location-based application server, the data files including profile data files containing user information of a user of the wireless mobile terminal and business data files containing business information for a plurality of businesses, wherein the location-based application server further operates to access the business data files to identify the business with the merchandise or service in accordance with preferences of the user of the wireless mobile terminal included in the profile data files.

4. The location-based services system of claim 1, wherein the location-services system further operates to identify a plurality of businesses with merchandise or services that will satisfy the request and generate a listing of said businesses to include in the response, wherein the listing is configured to include special deals or offers from each of the respective businesses included in the listing, wherein the businesses included in the listing and the deals or offers are configured for display on the wireless mobile terminal as selectable by a user of the wireless mobile terminal.

5. The location-based services system of claim 1, wherein the location-based application server further operates to generate an offer identifier to associate with an offer included in the response, wherein the offer is from a business identified with the location-based application server as being geographically proximate to the geographic information specified as part of the product information request, or the geographic indicator in the absence of the geographic information being specified as part of the product information request.

6. The location-based services system of claim 5, wherein the wireless mobile terminal further operates to receive the response, and display the offer and the offer identifier on a display included in the wireless mobile terminal, in response to a user command, the wireless mobile terminal is further operates to transmit to the location-based application server an acceptance of the offer; and the location-based application server further operates to store the offer, the offer identifier, and the acceptance of the offer in a database in association with an identifier of the business and in a personal list associated with a user of the wireless mobile terminal.

7. The location-based services system of claim 5, wherein the offer is part of an advertisement campaign comprising a plurality of offers to a plurality of different consumers, and a campaign offer identifier is assigned to each of the offers in the advertisement campaign.

8. The location-based services system of claim 5, wherein the location-based application server further operates to store a plurality of information related to the offer in a usage data file included in the database, wherein the information comprises a campaign identifier, a merchant name, a consumer identifier, a campaign code, a date, a time, a geographic location of the consumer and an offer number.

9. The location-based services system of claim 1, wherein the request for information for the product comprises a voice signal provided by a user of the wireless mobile terminal in a non-predefined natural language format.

10. The location-based services system of claim 1, wherein the request for information for the product is transmitted to the location-based application server using a wireless application protocol and comprises a text-based request for information.

11. The location-based services system of claim 1, wherein the request for information for the product is transmitted to the location-based application server using a web-based protocol.

12. The location-based services system of claim 1, wherein the location-based application server is responsive to a predetermined geographic radius around the geographic indicator or the specified geographic information to retrieve geographically relevant information, the predetermined geographic radius preset by a user of the wireless mobile terminal.

13. Location-based services system of claim 5, wherein the location-based application server further operates to retrieve a purchase price for the product from the stored offer based on the respective offer identifier in response to a subsequent request to purchase the product that includes the previously stored respective offer identifier.

14. A method for providing location based information with a location-based services system, the method comprising:
   the location-based services system receiving a wireless mobile terminal identifier and a geographic indicator from a wireless mobile terminal;
   the location-based services system receiving a request from a consumer operating the wireless mobile terminal, wherein the request comprises a product information request by the consumer for information on a product;
   the location-based services system processing the request to identify consumer specified geographic location information included as part of the product information request;
   the location-based services system generating a geographically tailored response to the request with the location-based services system based on the consumer specified geographic location information being included as part of the product information request;
   the location-based services system defaulting to a current geographic location of the wireless mobile terminal based on the wireless mobile terminal identifier and the geographic indicator only when the consumer specified geographic location information is absent from the product information request; and
   the location-based services system generating the geographically tailored response to the request with the location-based services system based on the current geographic location of the wireless mobile terminal only when the consumer specified geographic location information is not part of the product information request.

15. The method of claim 14, further comprising the location-based services system identifying a plurality of businesses located within a geographic region that is defined by the consumer specified geographic location or the current geographic location when the consumer specified geographic location is absent from the request.

16. The method of claim 15, wherein generating the geographically tailored response to the request further comprises generating, with the location-based services system responsive to the request, the geographically tailored response to the request that includes a respective offer and an offer identifier from each one of the identified businesses.

17. The method of claim 16, wherein generating the geographically tailored response to the request further comprises:
   displaying the respective offer and the offer identifier to the consumer with the location-based services system in a listing based on the geographically tailored response;
   the location-based services system receiving an acceptance of the respective offer by the consumer; and
   in response to the acceptance, the location-based services system storing the respective offer, the offer identifier, and the acceptance of the respective offer in a personal list associated with the consumer, and in a database associated with the one of the identified businesses.

18. The method of claim 14, wherein the response comprises an offer from a business for goods or services that is responsive to the request, and the method further comprises storing a plurality of transaction information about the offer, wherein the transaction information includes an advertising campaign identifier, a merchant name of the business making the offer, a consumer identifier, a date, a time, a geographic location of the consumer and an offer identifier associated with the offer.

19. The method of claim 18, further comprising the location-based services system receiving an acceptance of the offer from the consumer that constitutes a purchase of the product or service, and the location-based services system accessing the transaction information to validate the offer number, determine the nature of the offer, and store the acceptance as part of the transaction information.

20. The method of claim 19, further comprising generating with the location-based services system an analysis related to effectiveness of a location-based advertising campaign based on the stored transaction information.

21. The method of claim 19, wherein receiving an acceptance of the offer comprises the location-based services system receiving electronic payment information, the location-based services system transmitting the electronic payment information to a corresponding payment issuer, and the location-based services system transmitting, with a periodic batch file process, a data file containing payment information related to the purchase for storage as part of the transaction information, the transaction information accessible with the location based-services system to generate an advertising effectiveness analysis.

22. The method of claim 18, further comprising storing the transaction information in a personal list associated with the consumer, and in a business database associated with the business, the offer identifier displayable from the personal list with the wireless mobile terminal in response to a command from the user to present the offer identifier, and the displayed offer identifier useable to access the transaction information in the business database to determine terms of the offer.

23. A location-based services system comprising:
a wireless mobile terminal that generates a request for information on a product, a wireless mobile terminal identifier, and a geographic indicator, the request for information comprising a verbal request for information spoken by a user of the wireless mobile terminal in spontaneously generated natural language;
a location-based application server in communication with the wireless mobile terminal to receive the request for information, the wireless mobile terminal identifier, and the geographic indicator;
the location-based application server operates to process the request for information and identify and extract geographic location information specified by the user within the verbal request for information;
the location-based application server further operates to determine that the geographic location information is absent from the request for information, and to default to a current geographic location of the wireless mobile terminal based on the wireless mobile terminal identifier and the geographic indicator from the wireless mobile terminal;
the location-based application server further operates to identify a plurality of businesses and generate a business list comprising an offer identifier and an associated offer for each respective one of the identified businesses to include in a response that is responsive to the request for information on the product, the businesses identified with the location-based application server as being located in a geographic region defined by the current geographic location or the geographic location information specified by the user within the verbal request for information; and
the location-based application server further operates to store information related to the request and the response in a usage datafile.

24. The location-based services system of claim 23, wherein the location based application server further operates to transmit the response for receipt by the wireless mobile terminal, and the business list is configured to display the businesses and each respective offer on the wireless mobile terminal, and the location based application server further operates to receive from the wireless mobile terminal, in response to a user command, a purchase request responsive to the respective offer of one of the identified businesses; and
the location-based application server further operates to store the offer identifier and the purchase request in the usage datafile in association with the one of the identified businesses that will provide the product, and in a personal list associated with the user of the wireless mobile terminal.

25. The location-based services system of claim 23, wherein the information related to the request and the response comprises an advertising campaign identifier, merchant names of the businesses, a consumer identifier of the user, a date, a time, a geographic location of the wireless mobile terminal and the offer identifier.

26. A method for providing location based information with a location-based services system, comprising the steps of:
the location-based services system receiving from a wireless mobile terminal a wireless mobile terminal identifier and a geographic indicator;
the location-based services system receiving a request for information on a product from the wireless mobile terminal, the request for information comprising a verbal request for information spoken by a user of the wireless mobile terminal in spontaneously generated natural language;
the location-based services system processing the request to identify geographic information specified in the request;
the location-based services system determining that the geographic information is not specified in the request;
the location-based services system defaulting to a current geographic location of the wireless mobile terminal based on the wireless mobile terminal identifier and the geographic indicator;
the location-based services system identifying a plurality of businesses with products responsive to the request that are also geographically located within a geographic region defined by the geographic information specified in the request, or the current geographic location of the wireless mobile terminal when the geographic information is not specified in the request;
the location-based services system generating a business listing of the businesses comprising an offer identifier associated with a respective offer for each of the businesses with the location-based services system;
the location-based services system generating a structured response to the request for information on the product with the location-based services system, wherein the structured response includes the business listing; and
the location-based services system storing the request and the response in a usage datafile.

27. The method of claim 26, further comprising:
the location-based services system transmitting the structured response to the wireless mobile terminal for display of the business listing on the wireless mobile terminal;
receiving from the wireless mobile terminal a purchase request to one of the businesses in the business listing based on the respective offer of the one of the businesses; and
the location-based services system storing the respective offer and the purchase request in a business datafile associated with the business, and also in a personal list associated with a user of the wireless mobile terminal so that the offer identifier is later available to confirm terms of the respective offer, and the user can initiate a purchase transaction of the product based on the terms of the respective offer.

28. The method of claim 27, further comprising receiving a presentation of the offer identifier to the business; and accessing the business datafile, in response to presentation of the offer identifier, to validate the offer, to identify a nature of the offer, and to determine what product or service is to be provided based on the offer.

29. The method of claim 26, wherein receiving, with the location-based services system, a request for information comprises receiving a user selected geographic radius so that only businesses geographically located within the user selected geographic radius are located in the geographic region and are eligible for inclusion in the business listing.

30. A computer readable medium comprising a plurality of stored computer readable instructions executable by a computer in a location-based services system, the instructions comprising:

instructions to receive a wireless mobile terminal identifier and a geographic indicator from a wireless mobile terminal;

instructions to receive a request from a consumer operating the wireless mobile terminal, wherein the request comprises a product information request by the consumer for information on a product;

instructions to process the request to identify consumer specified geographic location information included as part of the product information request;

instructions to generate a geographically tailored response to the request with the location-based services system based on the consumer specified geographic location information being included as part of the product information request;

instructions to default to a current geographic location of the wireless mobile terminal based on the wireless mobile terminal identifier and the geographic indicator when the consumer specified geographic location information is absent from the product information request; and instructions to generate the geographically tailored response to the request with the location-based services system based on the current geographic location of the wireless mobile terminal when the consumer specified geographic location information is not part of the product information request.

31. A computer readable medium comprising a plurality of stored computer readable instructions executable by a computer in a location-based services system, the instructions comprising:

instructions to receive from a wireless mobile terminal a wireless mobile terminal identifier and a geographic indicator;

instructions to receive a request for information on a product from the wireless mobile terminal, the request for information comprising a verbal request for information spoken by a user of the wireless mobile terminal in spontaneously generated natural language;

instructions to process the request to identify geographic information specified in the request;

instructions to determine that the geographic information is not specified in the request;

instructions to default to a current geographic location of the wireless mobile terminal based on the wireless mobile terminal identifier and the geographic indicator;

instructions to identify a plurality of businesses with products responsive to the request that are also geographically located within a geographic region defined by the geographic information specified in the request, or the current geographic location of the wireless mobile terminal when the geographic information is not specified in the request;

instructions to generate a business listing of the businesses comprising an offer identifier associated with a respective offer for each of the businesses with the location-based services system;

instructions to generate a structured response to the request for information on the product with the location-based services system, wherein the structured response includes the business listing; and instructions to store the request and the response in a usage datafile.

* * * * *

UNITED STATES PATENT AND TRADEMARK OFFICE
CERTIFICATE OF CORRECTION

| | | |
|---|---|---|
| PATENT NO. | : 7,860,519 B2 | Page 1 of 1 |
| APPLICATION NO. | : 12/217223 | |
| DATED | : December 28, 2010 | |
| INVENTOR(S) | : Eric A. Portman et al. | |

It is certified that error appears in the above-identified patent and that said Letters Patent is hereby corrected as shown below:

In the Claims

In Column 23, line 8, delete "is" after --terminal--.

Signed and Sealed this
First Day of March, 2011

David J. Kappos
*Director of the United States Patent and Trademark Office*